(12) United States Patent
Lee

(10) Patent No.: US 7,912,509 B2
(45) Date of Patent: Mar. 22, 2011

(54) METHOD FOR AUTOMATICALLY SWITCHING INCOMING CALL SIGNAL OUTPUT MODE FROM VIBRATION TO RINGTONE USING VIBRATION DETECTION UNIT IN MOBILE COMMUNICATION TERMINAL

(75) Inventor: Hun Soo Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 946 days.

(21) Appl. No.: 11/301,712

(22) Filed: Dec. 12, 2005

(65) Prior Publication Data

US 2006/0128439 A1 Jun. 15, 2006

(30) Foreign Application Priority Data

Dec. 13, 2004 (KR) ........................ 10-2004-0104866

(51) Int. Cl.
 *H04M 1/00* (2006.01)
(52) U.S. Cl. .................... 455/567; 455/575.6; 455/90.3; 455/351; 455/346; 455/575.1; 340/663; 340/7.6; 340/582; 340/566; 340/545.4; 368/245; 381/87
(58) Field of Classification Search .................. 455/567, 455/575.6, 38.3, 343, 550, 575, 90, 351, 455/346; 340/825.46, 825.44, 825.47, 825.48, 340/311.1, 825.56, 663, 636, 384.71, 566, 340/500, 545.4, 582, 7.6; 368/245; 381/87
See application file for complete search history.

(56) References Cited

U.S. PATENT DOCUMENTS

| | | | | |
|---|---|---|---|---|
| 4,352,091 A * | 9/1982 | Yamasaki | ..................... | 340/7.58 |
| 5,172,092 A * | 12/1992 | Nguyen et al. | ............... | 340/7.58 |
| 5,189,389 A * | 2/1993 | DeLuca et al. | ............... | 340/7.58 |
| 5,272,475 A * | 12/1993 | Eaton et al. | .................... | 340/7.32 |
| 5,293,161 A * | 3/1994 | MacDonald et al. | .......... | 340/7.6 |
| 5,436,622 A * | 7/1995 | Gutman et al. | ................ | 340/7.6 |
| 5,442,345 A * | 8/1995 | Kwon | .......................... | 340/7.37 |
| 5,646,589 A * | 7/1997 | Murray et al. | ............... | 340/7.58 |
| 5,696,497 A * | 12/1997 | Mottier et al. | ............... | 340/7.58 |
| 5,797,101 A * | 8/1998 | Osmani et al. | ................ | 455/551 |
| 5,883,612 A * | 3/1999 | Kreitzer | ........................ | 345/619 |
| 5,956,626 A * | 9/1999 | Kaschke et al. | ............ | 455/115.1 |
| 5,986,567 A * | 11/1999 | Shima | .......................... | 340/7.51 |
| 6,160,489 A * | 12/2000 | Perry et al. | ..................... | 340/7.6 |
| 6,195,571 B1* | 2/2001 | Osuge | .......................... | 340/7.58 |
| 6,233,460 B1* | 5/2001 | Nojima | ......................... | 455/462 |
| 6,774,769 B2* | 8/2004 | Okada | ......................... | 340/407.1 |
| 6,973,336 B2* | 12/2005 | Heie | ............................. | 455/574 |
| 7,019,622 B2* | 3/2006 | Orr et al. | ..................... | 340/407.1 |
| 7,023,326 B2* | 4/2006 | Hwang | ..................... | 340/384.71 |
| 7,486,971 B2* | 2/2009 | Awada et al. | ................. | 455/567 |
| 2001/0053692 A1* | 12/2001 | Ito et al. | ........................ | 455/425 |
| 2002/0145522 A1* | 10/2002 | Pembroke | .................. | 340/573.1 |

(Continued)

*Primary Examiner* — Matthew D Anderson
*Assistant Examiner* — April G Gonzales
(74) *Attorney, Agent, or Firm* — Lee, Hong, Degerman, Kang & Waimey

(57) ABSTRACT

A method for automatically switching an incoming call signal output mode in a mobile communication terminal is disclosed. The method comprises the steps of determining whether or not a present incoming call signal output mode is a vibration mode when receiving incoming call, driving a vibrator to output vibration if it is determined that the present incoming call signal output mode is set to the vibration mode, detecting an intensity of actual vibration of the terminal via a vibration detection sensor when the vibration is output, followed by calculating transfer energy using the intensity of the actual vibration on the terminal, and automatically switching the incoming call signal output mode from the vibration mode to a ringtone mode according to comparison of the calculated transfer energy with a reference value. With the method, a user can easily recognize the incoming call signal.

6 Claims, 2 Drawing Sheets

U.S. PATENT DOCUMENTS

| | | |
|---|---|---|
| 2002/0177419 A1 | 11/2002 | Hwang |
| 2005/0064913 A1* | 3/2005 | Kim .............................. 455/567 |
| 2005/0208903 A1* | 9/2005 | Sakamoto .................... 455/90.3 |
| 2006/0094368 A1* | 5/2006 | Lee et al. ................... 455/67.13 |
| 2007/0032270 A1* | 2/2007 | Orr ............................... 455/567 |
| 2007/0037605 A1* | 2/2007 | Logan ........................... 455/567 |

* cited by examiner

METHOD FOR AUTOMATICALLY SWITCHING INCOMING CALL SIGNAL OUTPUT MODE FROM VIBRATION TO RINGTONE USING VIBRATION DETECTION UNIT IN MOBILE COMMUNICATION TERMINAL

CROSS REFERENCE TO RELATED APPLICATION

This application claims the benefit of Korean Patent Application No. 10-2004-0104866, filed on Dec. 13, 2004, which is hereby incorporated by reference as if fully set forth herein.

BACKGROUND OF THE INVENTION

1. Field of the Invention

The present invention relates to a mobile communication terminal, and more particularly, to a method for automatically switching an incoming call signal output mode in a mobile communication terminal, by which the incoming call signals are output in a state of being switched from a vibration output mode preset in the terminal to a ringtone mode through calculation of energy for transferring vibration to an outside upon output of the incoming call signals, thereby allowing a user to easily recognize the incoming call signals.

2. Discussion of the Related Art

Recently, many persons encounter noise pollution caused by incoming call signals generated irrespective of time and place due to rapid increase in use of mobile communication terminals.

In particular, ringtones of the incoming call signals generated in public places such as a large auditorium, lecture rooms, subways, buses and the like requiring quietness cause severe annoyance to other persons therein.

In order to avoid the annoyance of ringtone noise of the incoming call signals generating from the mobile communication terminal in the public places and the like requiring quietness, guidance broadcasting for demanding conversion of the incoming call signals to a vibration mode or management for prohibiting use of the terminal when entering such a public place has been performed.

The vibration mode (polite mode) is a method for outputting the incoming call signals to the user through vibration of the mobile communication terminal, for example, by directly transferring the vibration to the user via sensation of the user or by transferring the vibration to a rigid material such as a table so as to allow the user to recognize the incoming call as vibrating sound.

FIG. 1 is a block diagram illustrating the construction of a conventional mobile communication terminal.

Referring to FIG. 1, the mobile communication terminal supports a vibration mode. The mobile communication terminal generally includes a CDMA module 11 comprising a CDMA base band part, an RF processor, an antenna, and the like to connect the terminal to a CDMA network, a memory 13 to store an algorithm of outputting incoming call signals, and a controller (MSM/DSP) 12 to control a speaker 14 to output a ringtone upon receipt of incoming call and a vibrator 15 driven to generate vibration in a vibration mode according to the algorithm of the memory 13 while controlling overall operation of the terminal.

With the conventional mobile communication terminal, a user generally switches a mode of the mobile communication terminal from a ringtone mode to the vibration mode in order to prevent a ringtone of the terminal from annoying persons in a public place (subway or theater) or a conference room.

In general, the conventional mobile communication terminal remains in the vibration mode until the user inputs a predetermined key code to the terminal to switch the terminal to the ringtone mode.

Thus, if the user forgets to switch the terminal to the ringtone mode after switching the terminal to the vibration mode, the mobile communication terminal remains in the vibration mode.

In this regard, there is a problem in that, when the mobile communication terminal is in the vibration mode, the user cannot recognize the vibration, frequently failing to answer the phone.

In order to solve the problem, a method has been suggested, which forces the mobile communication terminal to switch from the vibration mode to the ringtone mode when the number of vibrations caused by incoming call signals is a predetermined value or more in the vibration mode of the mobile communication terminal, thereby slightly reducing the number of missed calls.

However, with the conventional mobile communication terminal, the vibration mode is set without considering external circumstance, and thus, if the mobile communication terminal is set to the vibration mode and placed on a soft article such as clothes or bedclothes which cannot transfer the vibration energy, the user cannot recognize the vibration of the mobile communication terminal.

In addition, in the case where the user sets the mobile communication terminal so as to automatically switch the vibration mode to the ringtone mode with reference to the number of vibrations, there occurs a problem in that, if the user does not recognize the vibration within a preset number of vibrations, the vibration mode is switched to the ringtone mode, failing to have an original politeness function of the mobile communication terminal.

SUMMARY OF THE INVENTION

Accordingly, the present invention is directed to a method for automatically switching an incoming call signal output mode in a mobile communication terminal that substantially obviates one or more problems due to limitations and disadvantages of the related art.

An object of the present invention is to provide a method for automatically switching an incoming call signal output mode in a mobile communication terminal, which allows the incoming call signal to be output in a state of being switched from a vibration output mode preset in the terminal to a ringtone mode through calculation of transfer energy upon output of the incoming call signal, thereby allowing a user to easily recognize the incoming call signals.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal, comprising: a vibration unit to generate vibration according to a incoming call control signal set to a vibration mode; a speaker to output audible sound according to another incoming call control signal set to a ringtone mode in order to inform a user of incoming call; a vibration detection sensor to measure vibration energy of the terminal through operation of the vibration unit operating in the vibration mode; and a controller to calculate the vibration energy transferred to an outside using a value supplied from the vibration detection sensor and to output a incoming call mode control signal.

Detailed construction of the mobile communication terminal according to the present invention has is characterized in that the controller outputs a control signal for outputting an incoming call signal through the speaker when the energy transferred to the outside is lower than a reference value.

In another aspect of the present invention, a method for automatically switching an incoming call signal output mode by controlling output of an incoming call signal in a mobile communication terminal, comprising the steps of: determining whether or not a present incoming call signal output mode is a vibration mode when receiving incoming call; driving a vibrator to output vibration if it is determined that the present incoming call signal output mode is set to the vibration mode; detecting an actual intensity of vibration of the terminal via a vibration detection sensor when the vibration is output from the vibrator, followed by calculating transfer energy using the actual intensity of the vibration of the terminal; and automatically switching the incoming call signal output mode from the vibration mode to a ringtone mode according to comparison of the calculated transfer energy with a reference value.

Here, if it is determined that the calculated transfer energy is lower than the reference value, it is determined that the user cannot recognize the vibration, and the incoming call output mode is switched from the vibration mode to the ringtone mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
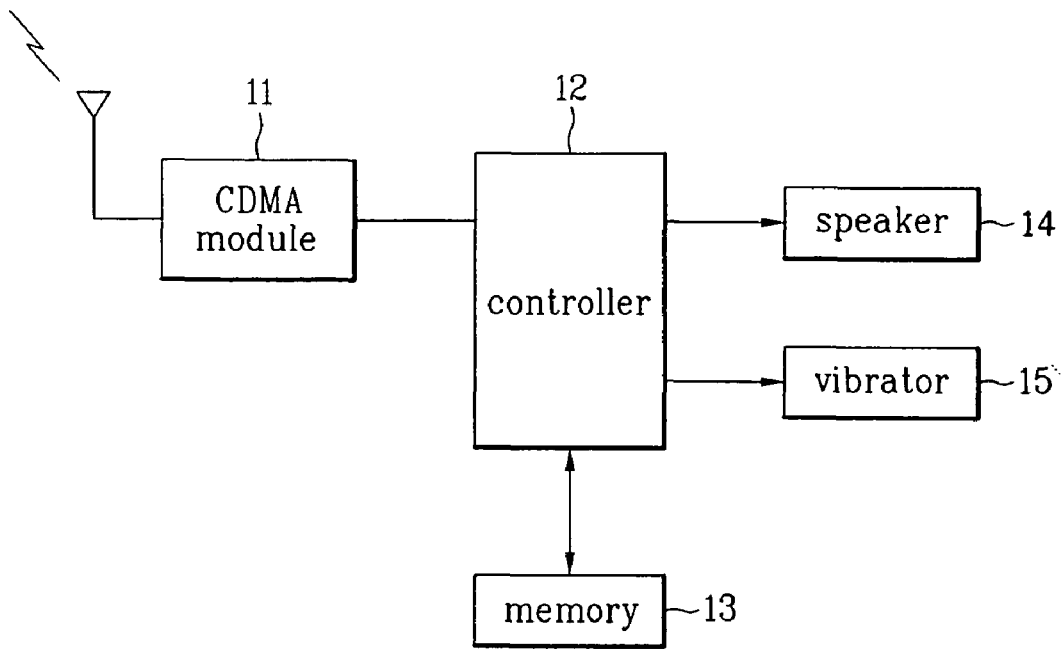
FIG. 1 is a block diagram illustrating the construction of a conventional mobile communication terminal.
Figure 2:
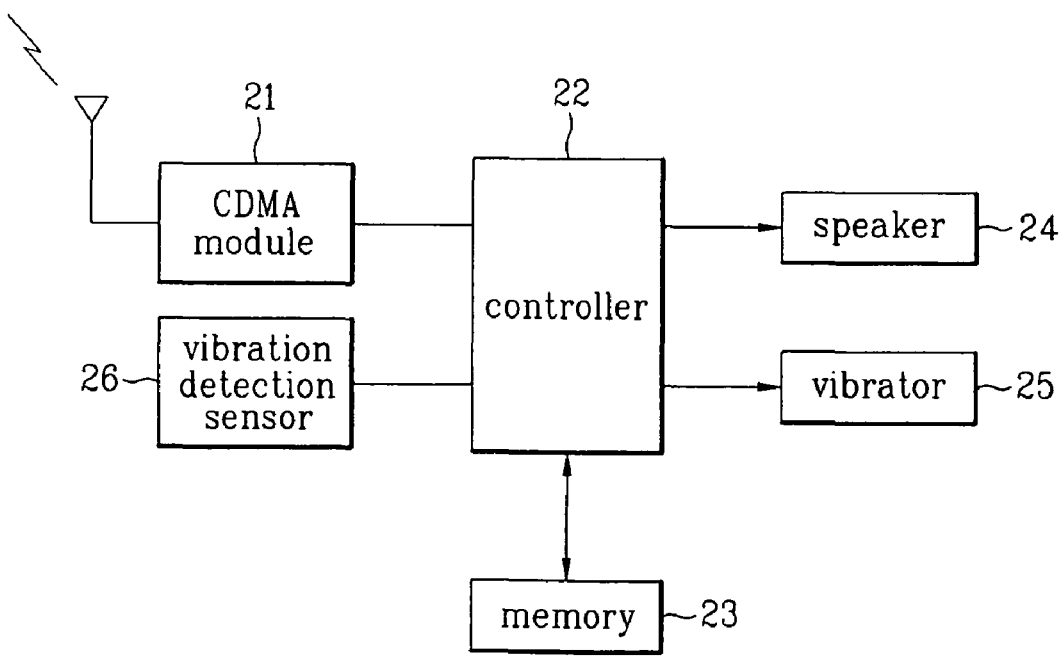
FIG. 2 is a block diagram illustrating the construction of a mobile communication terminal in accordance with one embodiment of the present invention.

FIG. 2 is a block diagram illustrating the construction of a mobile communication terminal in accordance with one embodiment of the present invention.

According to the present invention, a vibration detection sensor is provided to the terminal such that, if it is determined that a user cannot recognize an incoming call signal (vibration) in a vibration mode of the terminal, the vibration mode is automatically switched to a ringtone mode.

The present invention is designed under consideration of external circumstances, for example, a case where the terminal is placed on an article such as bedclothes which are poor conductors of vibration; such that the vibration mode is automatically switched to the ringtone mode, thereby enabling the user to easily recognize the incoming call signal. Needless to say, the user can select an automatic switch mode to automatically switch the vibration mode to the ringtone mode under consideration of the external circumstances.

As shown in FIG. 2, the mobile communication terminal of the invention comprises a CDMA module 21 comprising a CDMA base band part, an RF processor, an antenna and the like to connect the terminal to a CDMA network, a memory 23 to store an incoming call signal output algorithm, a controller 22 to control a speaker 24 to output a ringtone upon receipt of incoming call and a vibrator 25 driven to output vibration in a vibration mode according to the incoming call signal output algorithm of the memory 13 while controlling overall operation of the terminal, and a vibration detection sensor 26 to detect an output intensity of the vibrator 25 and an actual intensity of vibration changing according to external circumstances when the terminal receives the incoming call and enters the vibration mode in a state wherein the incoming call signal output algorithm stored in the memory 23 is in the vibration mode.

The controller 22 controls an incoming call signal output mode to be switched to a ringtone mode instead of the vibration mode when a difference between the output intensity of the vibrator 25 and the actual intensity of vibration detected by the vibration detection sensor 26 exceeds a predetermined level in the vibration mode.

If the incoming call signal output mode is not the vibration mode, not only is the vibrator 25 disabled, but also detection of the vibration detection sensor 26 and control operation for automatic switching of the incoming call signal output mode by the controller 22 are not performed.

The memory 23 also stores an output algorithm according to setting of the incoming call signal output mode in addition to various algorithms for operation of the terminal.

The incoming call signal output mode includes the ringtone mode, the vibration mode, a lamp mode for providing mute/non-vibration state, an automatic ringtone switching mode after two vibrations, and the like. According to the present invention, the memory stores an algorithm for automatically switching form the vibration mode to the ringtone mode when the terminal is placed on an article such as bedclothes which are a poor conductor of vibration.

A method for automatically switching an incoming call signal output mode in a mobile communication terminal in accordance with the invention will be described in detail as follows.

Figure 3:
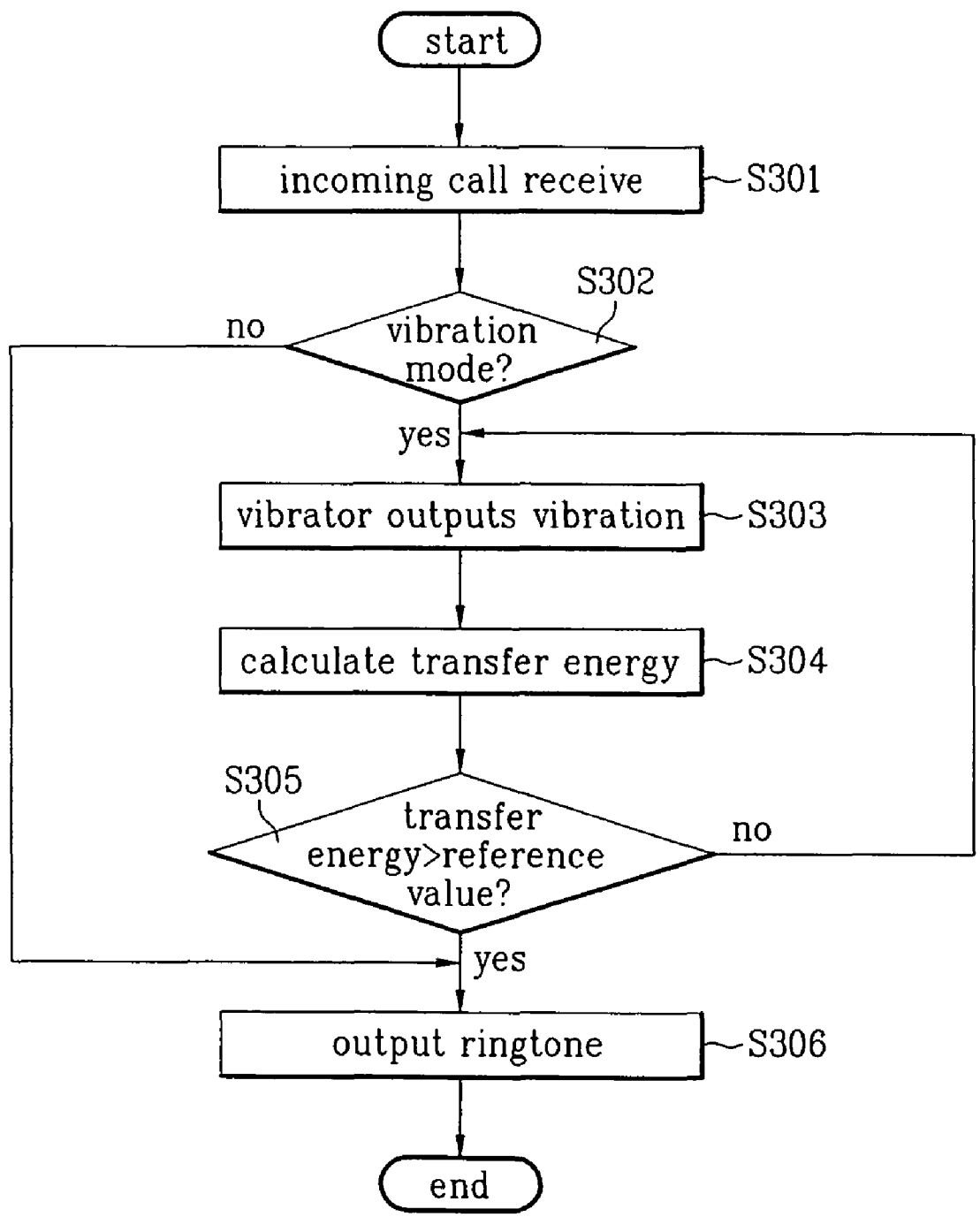
FIG. 3 is a flow chart illustrating a method for automatically switching an incoming call signal output mode in a mobile communication terminal in accordance with one embodiment of the present invention.

FIG. 3 is a flow chart illustrating the method for automatically switching the incoming call signal output mode in the mobile communication terminal according to the invention. The method of the invention allows the terminal to be automatically switched to a ringtone mode when the terminal is placed on an article, such as bedclothes, which is a poor conductor of vibration.

At first, when the terminal receives incoming call (S301), it is determined whether or not a present incoming call signal output mode is a vibration mode (S302).

If it is determined that the present incoming call signal output mode is set to the vibration mode, a vibrator is driven to output vibration (S303).

When the vibration is output, a vibration detection sensor operates to detect an actual intensity of vibration of the terminal, and a controller calculates transfer energy using an output intensity of the vibration from the vibrator and the actual intensity of the vibration detected by the vibration detection sensor (S304).

Here, the transfer energy can be changed according to external circumstances (conditions of the place where the terminal is placed). For example, if the terminal is placed in the place, such as inside the bedclothes, where the vibration of the terminal cannot be sufficiently transferred to the outside, the transfer energy becomes a low value even if the vibrator outputs the vibration with the same intensity.

Calculation of the transfer energy is performed by a method wherein the vibration detection sensor detects intensity of energy supplied to drive the vibrator, and the actual intensity of the vibration of the terminal caused by driving of the vibrator, and then calculates the transfer energy using a difference between the intensity of energy and the actual intensity of the vibration.

The calculated transfer energy is compared with a reference value (S305), and if it is determined that the calculated transfer energy is lower than the reference value, the controller switches from the present mode to the ringtone mode even if the present mode is the vibration mode (S306).

Here, the reference value is a value at which the user can recognize the vibration from the vibrator. The reason is that, when the transfer energy is a predetermined level or more, it is determined that the vibration of the terminal can be recognized by the user.

A ringtone is generated for a predetermined period of time after the terminal is switched to the ringtone mode.

In other words, when the predetermined period of time passes, it is determined that the mobile communication terminal is in a state wherein the user cannot recognize the incoming call signal even with the ringtone, and the ringtone is terminated.

When the user answers the phone or not after switching from the vibration mode to the ringtone mode, the terminal can be switched again to an original vibration mode. This serves to ensure an initial intention of the user who sets the incoming call signal output mode to the vibration mode.

In the step of comparing the calculated transfer energy with the preset reference value (S305), if the transfer energy is greater than the reference value, the incoming call signal output is continuously performed in the vibration mode. Needless to say, the output of the incoming call signal in the vibration mode is performed for a predetermined period of time, and then the vibration mode is terminated.

In the method for automatically switching the incoming call signal output mode in the mobile communication terminal, the energy for driving the vibrator in the terminal is compared with the transfer energy calculated after detecting the actual intensity of the vibration on the terminal caused by the vibration output from the vibrator, and when the difference therebetween is a predetermined value or more, the incoming call signal output mode is automatically switched to the ringtone mode.

As apparent from the above description, the present invention has effects as follows.

First, since the incoming call signal output mode is automatically switched to the ringtone mode with reference to the transfer energy after calculating the energy for transferring the incoming call signal to the outside in the vibration mode of the mobile communication terminal, frequency of missed calls is reduced.

Second, since it is possible to set the incoming call signal output mode to the polite mode while enabling the user to correctly recognize the incoming call signal, the mobile communication terminal promotes the user to set to the polite mode, which has been avoided by the user due to inaccurate recognition of incoming call in the prior art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal, comprising:
    a vibrator configured to generate vibration when an indication mode is set to a vibration mode;
    a speaker configured to output an audible sound when the indication mode is set to a ringtone mode;
    a vibration detection sensor configured to measure an actual intensity of vibration of the terminal changed according to external circumstances of the terminal when the vibrator operates and to detect an intensity of energy supplied to drive the vibrator; and
    a controller configured to calculate a vibration transfer energy transferred to an outside of the terminal using both the measured actual intensity of the vibration and the detected intensity of energy, and to output an indication mode control signal,
    wherein the controller outputs the indication mode control signal for switching the indication mode of the terminal from the vibration mode to the ringtone mode when the calculated vibration transfer energy is lower than a reference value.

2. The mobile communication terminal according to claim 1, wherein, when the indication mode is switched to the ringtone mode, a predetermined sound message is output through the speaker.

3. A method for automatically switching an incoming call signal output mode by controlling output of an incoming call signal in a mobile communication terminal, comprising the steps of:
    determining whether or not a present indication mode is a vibration mode;
    driving a vibrator to output vibration if it is determined that the present indication mode is set to the vibration mode;
    measuring an actual intensity of vibration of the terminal changed according to external circumstances of the terminal via a vibration detection sensor when the vibrator operates;
    detecting an intensity of energy supplied to drive the vibrator;
    calculating a vibration transfer energy transferred to the outside of the terminal using both the measured actual intensity of the vibration and the detected intensity of energy; and
    switching the vibration mode to a ringtone mode when the calculated vibration transfer energy is lower than a reference value.

4. The method according to claim 3, wherein, when a predetermined period of time passes after switching the vibration mode to the ringtone mode, the ringtone mode is switched to an original vibration mode.

5. The terminal of claim 1, wherein the controller sets the indication mode to the vibration mode if a predetermined period time passes after switching to the ringtone mode.

6. The terminal of claim 5, wherein the predetermined period could be preset by a user.

* * * * *